United States Patent
Ponomarev et al.

[11] Patent Number: 5,781,194
[45] Date of Patent: Jul. 14, 1998

[54] REAL-TIME PROJECTION OF VOXEL-BASED OBJECT

[75] Inventors: Roman E. Ponomarev; Dmitry Y. Tolstov; Denis A. Trofimov, all of Moscow, Russian Federation

[73] Assignee: AnimaTek International, Inc., San Mateo, Calif.

[21] Appl. No.: 705,401

[22] Filed: Aug. 29, 1996

[51] Int. Cl.[6] .................................................. G06T 17/00
[52] U.S. Cl. ........................................... 345/424; 345/427
[58] Field of Search .................................. 345/419, 424, 345/427

[56] References Cited

U.S. PATENT DOCUMENTS

| | | | |
|---|---|---|---|
| 4,985,856 | 1/1991 | Kaufman et al. | 364/522 |
| 5,101,475 | 3/1992 | Kaufman et al. | 395/124 |
| 5,113,357 | 5/1992 | Johnson et al. | 395/124 |
| 5,166,876 | 11/1992 | Cline et al. | 345/424 |
| 5,187,660 | 2/1993 | Civanlar et al. | 364/413.19 |
| 5,442,733 | 8/1995 | Kaufman et al. | 395/124 |
| 5,506,785 | 4/1996 | Blank et al. | 345/419 X |
| 5,515,484 | 5/1996 | Sfarti et al. | 395/124 |
| 5,594,844 | 1/1997 | Sakai et al. | 345/427 |

*Primary Examiner*—Mark K. Zimmerman
*Attorney, Agent, or Firm*—Lumen Intellectual Property Services

[57] ABSTRACT

Fast real-time rendering of a voxel-based 3-D object is achieved by constructing a surface voxel chain and using incremental vectors in describing positions of the chain elements. The rotations of all incremental vectors from a world space into a camera space are performed prior to a real-time imaging process, and the resulting rotations are stored in a lookup table. During the real-time process, only the information for surface voxels is stored and transformed; therefore, the required memory size for the 2-D imaging process is dramatically reduced, while the speed is greatly increased.

5 Claims, 6 Drawing Sheets

REAL-TIME PROJECTION OF VOXEL-BASED OBJECT

FIELD OF THE INVENTION

The field of the invention relates generally to computational methods for real-time rendering of three-dimensional data from an arbitrary viewing direction. More particularly, the field of the invention relates to construction of a voxel chain describing surfaces of a three-dimensional object, projection of the surface voxels, and formation of a two-dimensional image onto an arbitrary camera plane.

BACKGROUND OF THE INVENTION

The importance of computer modeling of three-dimensional (3-D) objects has been recognized in a wide variety of applications, e.g., computed tomography, magnetic resonance imaging, computer animation and other similar applications. The performance of a 3-D rendering process is measured by two figures of merit. One is the amount of memory required to store all the essential information related to the object being projected; the other is the projection speed of all polygons or voxels being used to describe the object. Since the total number of polygons or voxels depends on the size of the object, larger objects generally require more memory and time for rendering. For a given number of polygons or voxels, the projection speed can be improved at the expense of the memory size. Although a larger memory which holds more pre-calculated data can provide for faster access to the stored information and help increase the processing speed, the improved speed is still typically slower than real-time speeds for large and complex objects. If there exists a 3-D rendering process which is able to project 2-D images in real time with small required memory, the range of applications for computer modeling of 3-D data will be expanded and the existing applications will be more widely implemented.

In the case of the computer-game industry, the reduction of the required memory and improvement of the speed are both of great importance because they help a computer animation program perform better on low-end computers. Since most customers of computer games are individuals rather than corporations, the games are mainly installed on personal computers rather than high speed workstations with enormous memory capabilities. Also, the individual buyers often do not posses state-of-art personal computers. Therefore, lower memory requirements and faster performance are natural advantages to any product in the computer game industry. In addition, those customers owning state-of-art computers are able to run computer games with more complexities when the rendering process used in such games is simplified.

Computer-manipulated 3-D data are classified into two categories. In the first category, surfaces of an object are usually represented by planar polygons in a continuous geometric space ($R^3$). Each polygon has an associated set of parameters which characterizes attributes of the corresponding surface area, such as its color and transparency. One major drawback of the polygon-based representation is that its rendering time depends upon the complexity of the object. If the object shape is complex, a large number of polygons must be used to reproduce all the details. For instance, an exact model of a human body can require as many as 100,000 polygons. Since the projection of each polygon requires at least one multiplication of two matrices, the projection of the entire model is much too time consuming for any real-time implementation.

In the second category, a 3-D object is represented by elementary volume cells in a discrete voxel space ($Z^3$). Associated with each voxel are attributes, or properties, of the corresponding volume cell, such as its color, transparency, and position. The cell position indicates whether a cell is on a surface or inside the object. For a surface voxel, the surface normal vector is also specified as a cell property. Since the object attributes can vary continuously within a voxel, the cell is further divided into smaller cubes. The average characteristics over these smaller cubes are assigned to the entire voxel. Each voxel is stored as an element of a three dimensional array which is saved in a computer memory system. Since the total volume of an object, as well as the size of its array, is proportional to the third power of linear object size, the amount of memory required to store the voxel information for a large object is enormous.

The two-dimensional (2-D) projection of a voxel-based object is achieved using either the image-order or object-order methods. The image-order method uses a backward mapping scheme where projecting rays are cast from each pixel on an image plane to the volume data. Only the information of the voxel closest to the image plane is retained as the final pixel value. The object-order method, on the other hand, uses a forward mapping scheme where all the voxels are mapped onto the image plane, and the projections of invisible voxels are rejected. Since the size of a voxel-based array is usually large, the projection speed is much too slow for real-time applications. In order to ease the memory and speed limitations, various modifications to the above imaging methods have been proposed by several inventors in the past.

By way of example, Kaufman et al., U.S. Pat. No. 5,101,475 describes a device which uses the image-order technique for generating parallel and perspective projections of 3-D voxel based images, viewed along arbitrary viewing directions. The device improves the speed of the rendering process by using a special memory structure which provides for a fast access to each voxel. However, the proposed device was not designed to reduce the large memory size required by the 3-D rendering process.

Civanlar et al., U.S. Pat. No. 5,187,660 provides a facility for greatly enhancing the rate at which volumetric data is processed for two-dimensional display. In this 3-D rendering process, only the coordinates for a few voxels are specified; while the locations for most voxels are described by incremental vectors which connect the centers of two neighboring voxels. After the projections of all incremental vectors are calculated, the projected coordinates for each voxel described by an incremental vector are calculated by adding the projection of its corresponding incremental vector and the projected coordinates of the voxel where the incremental vector initiates. Since only three additions are required for each voxel projection, the speed of the rendering process is improved. However, there exists one major drawback for this system. It uses a large amount of memory to store the information for voxels inside an object even though these voxels are invisible from any viewing direction. Moreover, since the projections of internal voxels are always rejected in forming the final image, the system spends a large portion of time unnecessarily projecting these internal voxels.

Accordingly, it is a primary object of the present invention to provide a method which further improves the speed of generating 2-D images from 3-D data. It is, a further object of the invention to provide a method to dramatically reduce the amount of memory required by a 2-D imaging process.

SUMMARY OF THE INVENTION

These objects and advantages are attained by constructing a voxel chain which only consists of voxels located at surfaces of a 3-D object and using incremental vectors to calculate geometrical coordinates of each element of the voxel chain in a camera coordinate system. In order to construct the voxel chain, the surface voxels are selected from all the voxels of the discretized 3-D object, including external, surface, and internal voxels. The selected surface voxels are then stored in a computer memory system in the form of a voxel chain. For the first element of the voxel chain, its set of coordinates in a world coordinate system is saved as an attribute of the voxel; for all other voxels, their positions are characterized by type indices of their incremental vectors. During a real-time 2-D imaging process, each type of incremental vector is projected into a camera coordinate system, and the resulting projections are saved into a lookup table. Since the position of the first voxel in the chain is directly described by its coordinates in the world space, its coordinates in the camera space are calculated. Afterwards, the coordinates of all other voxels in the camera space are obtained by adding the projection of the associated incremental vector to the projected coordinates of the voxel where the incremental vector initiates. The projection of the incremental vector is obtained from the lookup table based on the type index. The resulting coordinates in the camera space are used to determine whether or not the attributes of the voxel being projected are saved into a 2-D imaging buffer. If the corresponding cell of the 2-D imaging buffer contains the attributes coming from a voxel which is farther from the image plane than the voxel currently being projected, the attributes of the current voxel supersede the old values. The types of attributes relevant to the 2-D imaging process comprise color, transparency, and other properties of the 3-D object relevant to the formation of different kinds of 2-D images.

DETAILED DESCRIPTION

Figure 1:
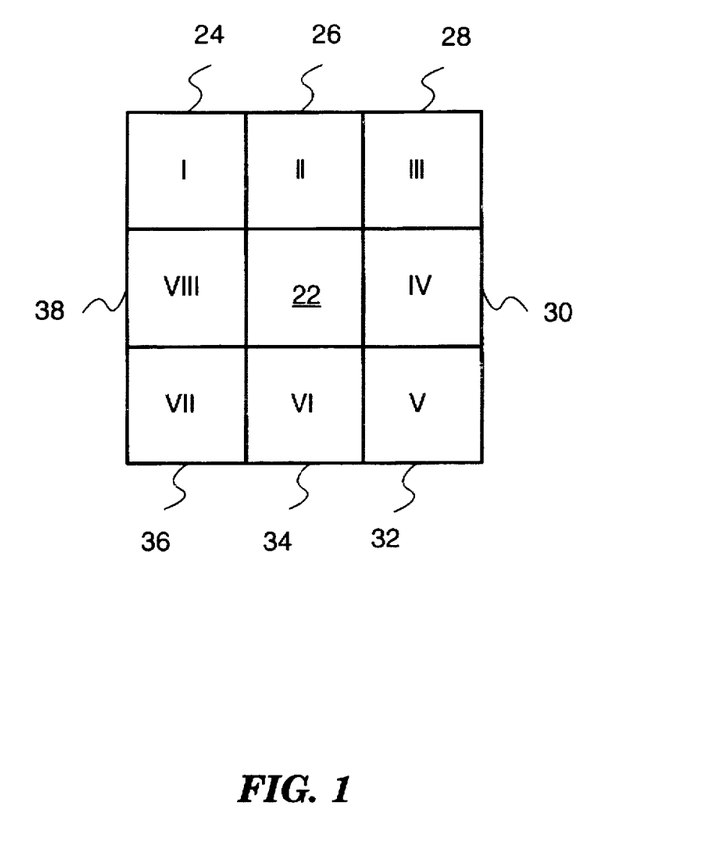
FIG. 1 is an illustration of the concept of incremental vectors in the 2-D space according to the invention.

In order to clearly understand the proposed method of fast rendering of voxel-based data, a thorough understanding of the concept of incremental vectors is necessary. As illustrated in FIG. 1, a 2-D square-voxel 22 is surrounded by at most eight neighboring voxels. The location of each neighboring voxel is specified by an incremental vector which initiates from the originating voxel 22. The type of an incremental vector is determined by the relative position between the neighboring voxel with which the incremental vector is associated and the originating voxel 22. Since the maximum number of neighboring voxels is eight, there are at most eight types of incremental vectors in the 2-D square-voxel based space. In particular, the incremental vector for a voxel 24 is designated as Type I, the one for a voxel 26 as Type II, the one for a voxel 28 as Type III, the one for a voxel 30 as Type IV, the one for a voxel 32 as Type V, the one for a voxel 34 as Type VI, the one for a voxel 36 as Type VII, and the one for a voxel 38 as Type VIII.

Figure 2:
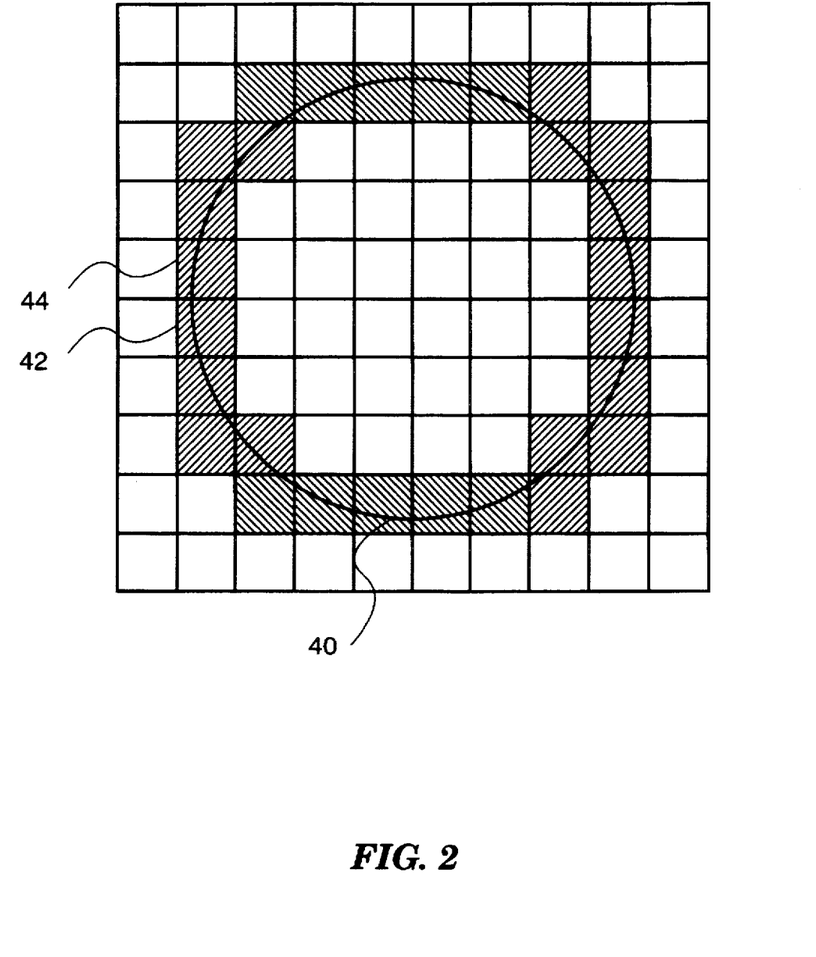
FIG. 2 shows an application of incremental vectors in 2-D space according to the invention.

The position of each square voxel is described by an incremental vector with a certain type-index. As illustrated in FIG. 2, a planar circle 40 is represented by square voxels indicated by the shaded boxes. A voxel 42 is designated as the first voxel such that its location is described by the coordinates in the world coordinate system rather than by an incremental vector. The position of a second voxel 44 can be described by an incremental vector whose type becomes obvious if the voxel 42 is identified with voxel 22 of FIG. 1. In this case, the voxel 44 then takes the position of the voxel 26 in FIG. 1. Therefore, its incremental vector is of Type II. The position of each voxel of the circle 40 except the first voxel 42 is thus characterized by one of the eight type indices, and the entire chain can be represented by the world coordinates of the first voxel followed by a list of incremental vector types.

In analogy with the above-described situation in 2-D space, in 3-D space each cubic voxel has twenty-six neighboring voxels, yielding twenty-six types of incremental vectors. The coordinates of a cubic voxel can be obtained by adding its incremental vector to the coordinates of the voxel where the incremental vector initiates. If the voxels used in the discretization are not cubic, the total number of the types of the incremental vectors may not be twenty-six, but the methodology presented above is still applicable.

Figure 3:
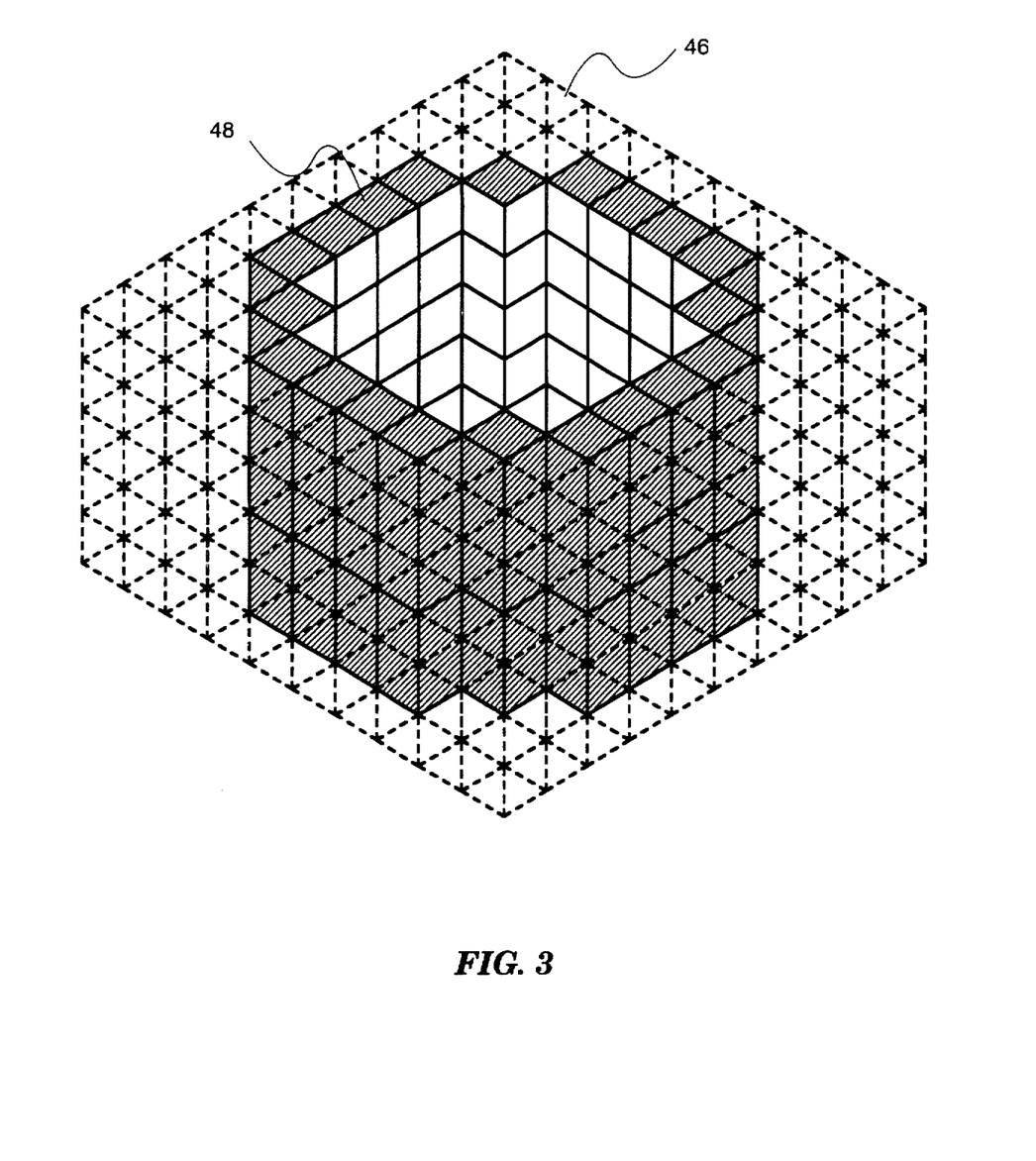
FIG. 3 is an illustration of a 3-D object with external, surface and internal voxels according to the invention.

For a 3-D object, the total number of voxels increases dramatically with the size of the object, as illustrated in FIG. 3. There are three types of voxels, e.g., interior voxels which are mostly invisible, surface voxels, such as a voxel 48, and exterior voxels, such as a voxel 46. The exterior voxels are used to provide the object with a more regular shape and are transparent. If all the internal, surface and external voxels are projected during a 2-D imaging process, a significant amount of time would be wasted because all the exterior voxels are transparent and all the interior voxels are invisible. They are of little importance to the imaging process and yet they account for the majority of the total number of voxels.

Figure 4:
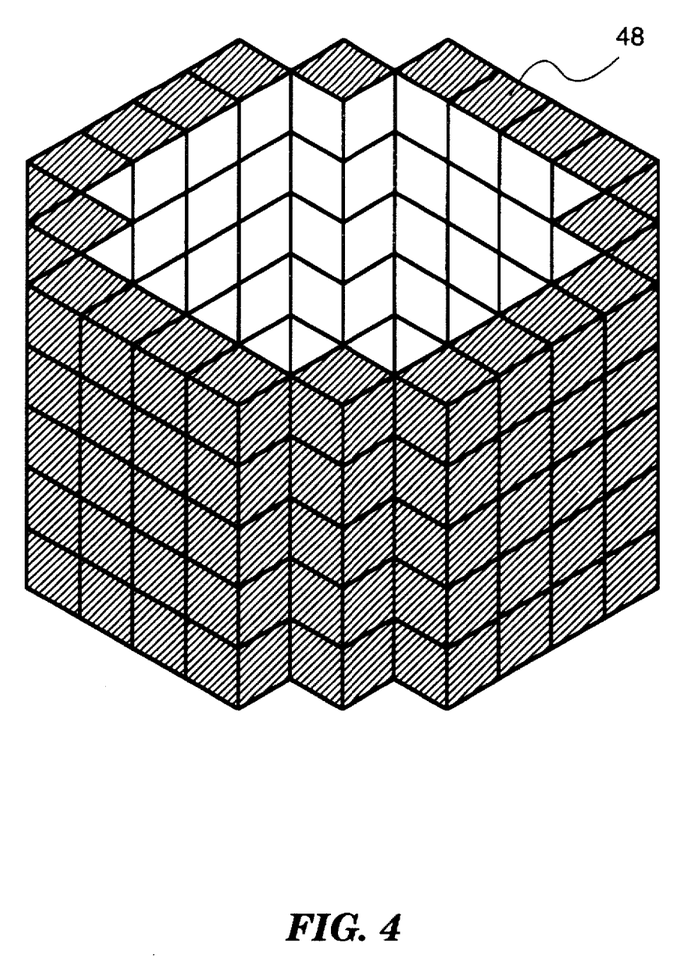
FIG. 4 is an illustration of a 3-D object with only surface voxels according to the invention.

In the present invention, the surface voxels are selected from all the voxels of an object, as shown in FIG. 4, and are arranged in a special chain. In a preferred embodiment, the selection and chain creation are accomplished by a special software tool called Plug-In to Autodesk's 3D Studio®. The program tool is provided with 3-D object information and performs an automatic voxel selection and chain construction prior to the real-time imaging process. The resulting voxel chain is stored in a computer memory or data storage system as a 1-D string together with palette and animation parameters for the object.

The object is rendered in real time from the 1-D voxel chain representation as follows. Two 2-D buffer arrays are allocated in memory for the rendering process. The first array of cells, called a C-buffer, contains color attributes for the pixels in the image. The other array of cells, called the Z-buffer, contains distance attributes for the pixels in the image; more specifically, the distance attribute for a given cell contains the distance between a pixel in the image and the corresponding voxel in the object.

Except for the first element, all the voxels are characterized by the type indices of their incremental vectors, and their coordinates are calculated as follows.

$$X_{k+1} = X_k + dX_{k+1} \tag{1}$$

$$Y_{k+1} = Y_k + dY_{k+1} \tag{2}$$

$$Z_{k+1} = Z_k + dZ_{k+1} \tag{3}$$

where $(X_k, Y_k, Z_k)$ and $(X_{k+1}, Y_{k+1}, Z_{k+1})$ are the respective coordinates of the $k^{th}$ and $(k+1)^{th}$ elements of the chain in the world coordinate system. The vector $D_{k+1}=(dX_{k+1}, dY_{k+1}, dZ_{k+1})$ is the incremental vector corresponding to the type index associated with the $(k+1)_{th}$ voxel in the world coordinate system.

Figure 5:
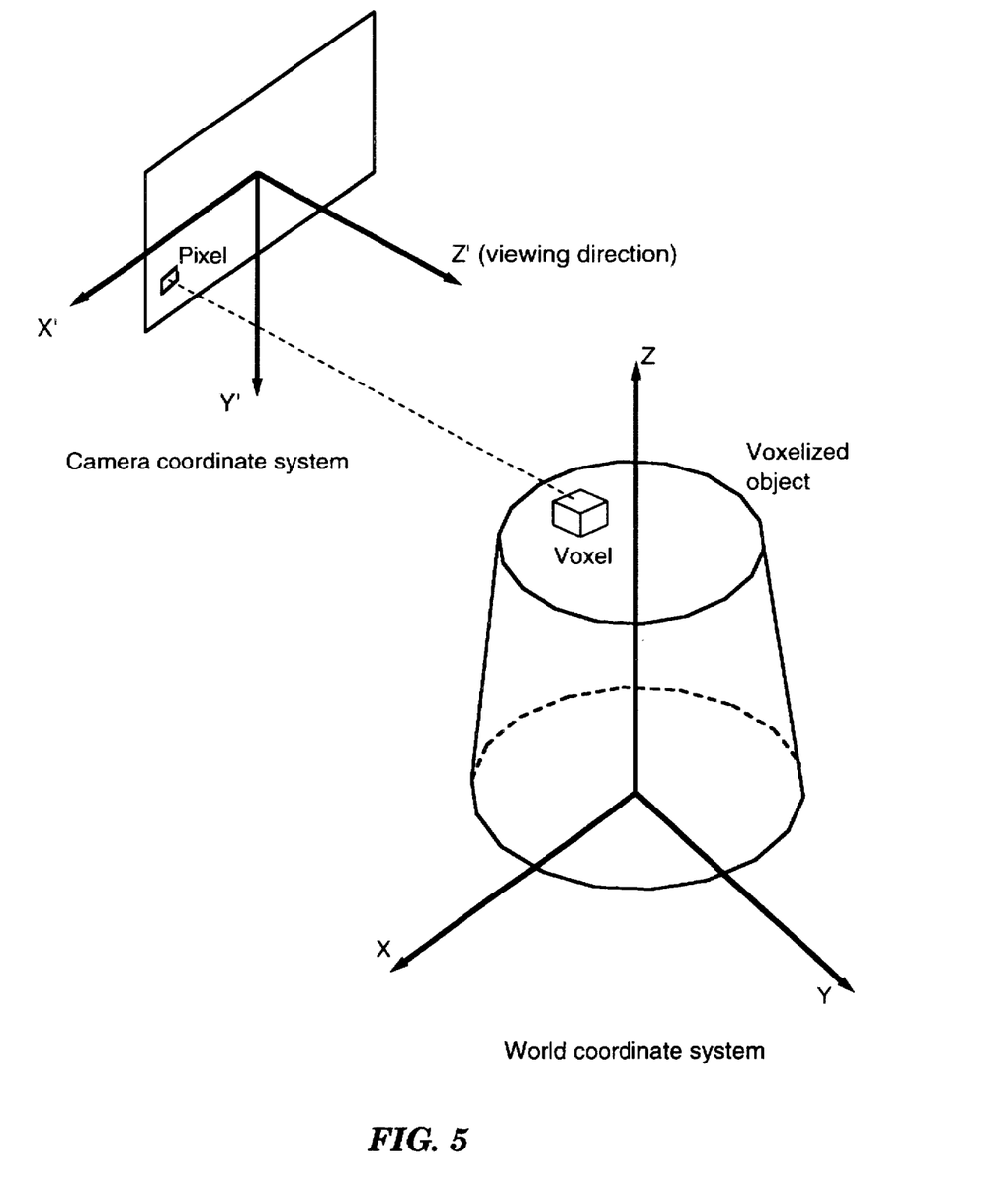
FIG. 5 describes the relation between the world coordinate system and a camera coordinate system according to the invention.

For a voxel chain described above, the image-order method is not suitable for the 2-D imaging due of the lack of a fast algorithm to determine which voxel in the chain is the farthest from the viewing plane. Therefore, the object-order method is used to view a 3-D object with respect to the camera coordinate system, as illustrated in FIG. 5. In the figure, the z'-axis is normal to the x'-y' viewing plane.

Figure 6:
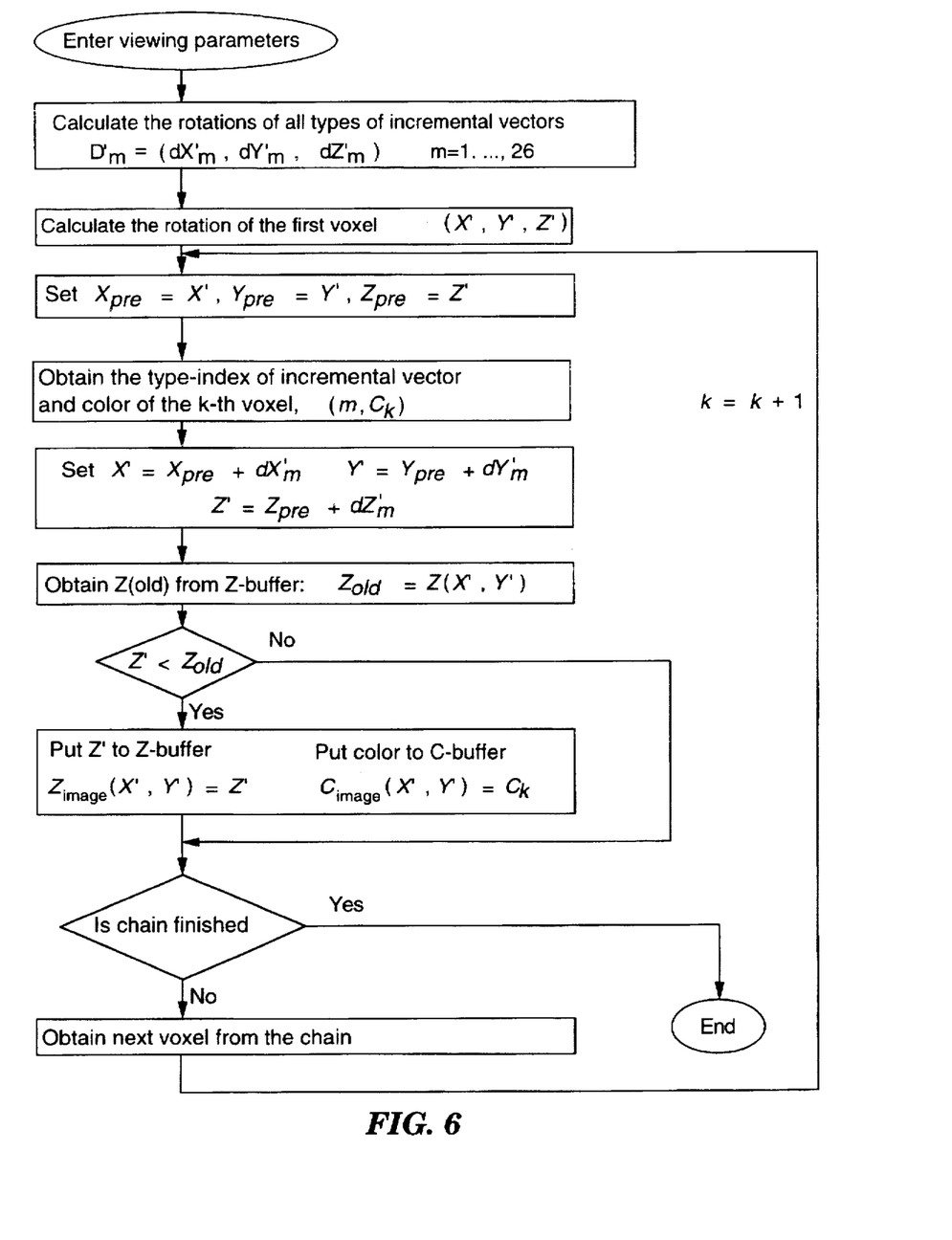
FIG. 6 is a flow chart describing the procedures for fast rendering of voxel-based data according to the invention.

A preferred embodiment of the present invention is described in reference to the flow chart of FIG. 6. Before a rendering process starts, the 3-D viewing parameters are selected. The viewing parameters specify a viewing direction with respect to the world coordinate system and are determined, for example, by an orientation determined from user input. During the real-time process, the incremental vectors of all 26 types are rotated in the world coordinate system as follows.

$$D'_m = D_m T \qquad (4)$$

$$T = \begin{bmatrix} \cos\alpha\cos\gamma + \sin\alpha\sin\beta\sin\gamma & -\sin\alpha\cos\gamma + \cos\alpha\sin\beta\sin\gamma & \cos\beta\sin\gamma \\ \sin\alpha\cos\beta & \cos\alpha\cos\beta & -\sin\beta \\ -\cos\alpha\sin\gamma + \sin\alpha\sin\beta\cos\gamma & \sin\alpha\sin\gamma + \cos\alpha\sin\beta\cos\gamma & \cos\beta\cos\gamma \end{bmatrix} \qquad (5)$$

where $D'_m$ and $D_m$ are, respectively, the rotated and unrotated incremental vectors of the $m^{th}$ type. T is the rotation matrix, and $\alpha$, $\beta$, and $\gamma$ are swivel, tilt, and vertical rotation angles between the camera coordinate system and the world coordinate system. The rotations of all types of incremental vectors are saved into a lookup table for latter use. At this point the Z-buffer is appropriately initialized with values larger than any possible distance between the image plane and the voxels, and the C-buffer is initialized with initial color attributes, e.g. indicating transparent pixels.

In the second step, the coordinates of the first voxel in the chain are transformed from the world space into the rotated camera space as follows.

$$V'_1 = (V_1 - W)T \qquad (6)$$

$$V'_1 = (X'_1, Y'_1, Z'_1) \qquad (7)$$

where $V'_1$ and $V'_1$ are the rotated and unrotated vectors, respectively, for the first voxel in the chain. W is the vector pointing from the origin of the world coordinate system to that of the rotated camera coordinate system.

Next, the color $C_1$ of the first voxel is obtained from a C-buffer, and the index m of the incremental vector pointing to the first voxel is obtained from a Z-buffer. For the first voxel, the index m is always zero which represents a zero vector. The color of the first voxel is then saved into a 2-D C-buffer $C_{image}$ as $$C_{image}(X'_1, Y'_1) = C_1 \qquad (8)$$

and the z'-coordinate of the first voxel is saved into a 2-D Z-buffer $Z_{image}$ as $$Z_{image}(X'_1, Y'_1) = Z'_1 \qquad (9)$$

Afterwards, the current coordinates X', Y', and Z' are saved as a set of previous coordinates $X'_{pre}$, $Y'_{pre}$, and $Z'_{pre}$. Next, the color $C_k$ and index m of the incremental vector associated with the second (k=2) voxel are obtained. The vector $D'_m$ of the type-m incremental vector in the camera coordinate system is retrieved from the lookup table. The coordinates $(X'_k, Y'_k, Z'_k)$ of the second (k=2) voxel are easily calculated by $(X'_k, Y'_k, Z'_k) = (X'_{pre}, Y'_{pre}, Z'_{pre}) + D'_m$, and these coordinates are saved as the current coordinates X', Y', and Z'. Next, Z' is compared to $Z_{image}(X', Y')$, which is the z'-coordinate at (X', Y') previously saved in the 2-D Z-buffer. If Z' is smaller, then the second (k=2) voxel is closer to the image plane than the voxel whose coordinates in the camera coordinate system are $(X', Y', Z_{image}(X', Y'))$; therefore, the stored color in the 2-D C-buffer should be updated:

$$C_{image}(X', Y') = C_k \qquad (10)$$

as well as the value store in the 2-D Z-buffer:

$$Z_{image}(X', Y') = Z'$$

Otherwise, $C_{image}(X', Y')$ should remain unchanged. Note that if no previous voxel was saved in this cell, then the buffers are updated since the Z-buffer is initialized with maximal values.

If the length of the voxel chain is longer than two, the current coordinates are saved as the set of previous coordinates, and the next element (k=3) of the chain is processed in the same way as described for the second (k=2) element. This loop is iterated until the end of the chain is reached.

At the end of the chain, the 2-D C-buffer contains the color information for the voxels which are the closest to the image plane. This is consistent with what is seen by a viewer at the origin of the image plane. For the entire imaging process, only the surface voxels are stored and projected, so the required memory size is drastically reduced and the speed is greatly improved to the real-time level.

The implementation of the method for fast projection of a 3-D voxel-based object discussed above can be achieved on almost all computer platforms because it requires a relatively small memory size and less intensive calculations with respect to other methods proposed before. The platforms which can be used comprise Macintosh, PC-compatible, and various workstations. Because this method only processes the surface voxels, the amount of data being manipulated is relatively small. The computer systems do not require either a special memory buffer to provide for a faster access to each voxel nor a special parallel-computing microprocessor to further speed up the voxel projections. The present projection method can be implemented in almost any computer language by anyone skilled in the art of computer programming. Preferably, the method is implemented in a language which provides for the best compatibility between different computer platforms, thus the program written for one platform can be easily ported to another platform without any major revisions, which enables the software manufacturer to support the program in multi-platforms with relatively low cost.

One application of the invention is to a real-time computer-game program which only requires small memory. The computer game can be of any types that demands high speed 2-D imaging of 3-D objects, such as a boxing match. Since the 2-D images can be projected in real time with the currently proposed method, they do not need to be pre-calculated in order to reduce the required memory. Consequently, higher speed and larger flexibility for the game can be achieved.

One another application is to a real-time medical imaging system. The system utilizes the proposed technique to perform real-time 2-D imaging of 3-D data determined from computerized tomography (CT) scanners, magnetic resonance imaging (MRI) equipment, or the like. During emergency trauma situations, the real-time system can help medical personnel quickly diagnose their patients.

It will be clear to one skilled in the art that the above embodiment may be altered in many ways without departing from the scope of the invention. For example, in addition to color, other attributes of a 3-D object, such as transparency, can also be projected and form a 2-D image. Shapes other than rectilinear may be used to model voxels. For example, pyramid-shaped voxels may be used in place of cubes. Accordingly, the scope of the invention should be determined by the following claims and their legal equivalents.

What is claimed is:

1. A computer implemented method of rendering a 3-D voxel-based object from a voxel chain representation of the object stored in a computer memory the method comprising:
   a) rotating a set of incremental vectors to obtain a set of rotated incremental vectors;
   b) saving the set of rotated incremental vectors in a lookup table in the computer memory;
   c) calculating coordinates in a camera coordinate system of a first voxel in the voxel chain representation;
   d) calculating coordinates in a camera coordinate system of a second voxel of the voxel chain through the use of one of the rotated incremental vectors; and
   e) displaying a rendered image of the 3-D voxel-based object from the calculated coordinates.

2. The method of claim 1 where said calculating coordinates of a second voxel further comprises the following steps:
   a) obtaining from the voxel chain representation a type index of the second voxel;
   b) obtaining from the lookup table a rotated incremental vector corresponding to the type index;
   c) determining the coordinates of the second voxel by adding the rotated incremental vector to the coordinates of the first voxel; and
   d) storing an attribute of the second voxel in a cell of an image buffer if a previous attribute already stored in the cell corresponds to a voxel farther from an image plane than the second voxel.

3. The method of claim 2 wherein the attribute is chosen from the group consisting of color and transparency.

4. A computer implemented method for rendering a 3-D voxel-based object comprising the following steps:
   a) generating a voxel chain from surface voxels of the 3-D voxel-based object, wherein the voxel chain comprises world coordinates of a first voxel and a sequence of incremental vector type indices of other voxels;
   b) calculating camera coordinates of the first voxel from the world coordinates of the first voxel;
   c) calculating a sequence of camera coordinates of the other voxels from the sequence of incremental vector type indices and a set of rotated incremental vectors; and
   d) displaying a rendered image of the 3-D voxel-based object, wherein the rendered image is derived from the camera coordinates of the first voxel and the sequence of camera coordinates of the other voxels.

5. An electronic computer comprising a display, a memory, and a processor, wherein the processor executes the following steps:
   a) retreiving from the memory a voxel chain representing surface voxels of a 3D voxel-based object, wherein the voxel chain comprises world coordinates of a first voxel and a sequence of incremental vector type indices of other voxels;
   b) calculating camera coordinates of the first voxel from the world coordinates of the first voxel;
   c) calculating a sequence of camera coordinates of the other voxels from the sequence of incremental vector type indices and a set of rotated incremental vectors; and
   d) displaying on the display a rendered image of the 3-D voxel-based object, wherein the rendered image is derived from the camera coordinates of the first voxel and the sequence of camera coordinates of the other voxels.

* * * * *